[51.]
E. WATTS.
Improvement in Machines for Shaving Corn.
No. 118,564. Patented Aug. 29, 1871.
Fig. 1.
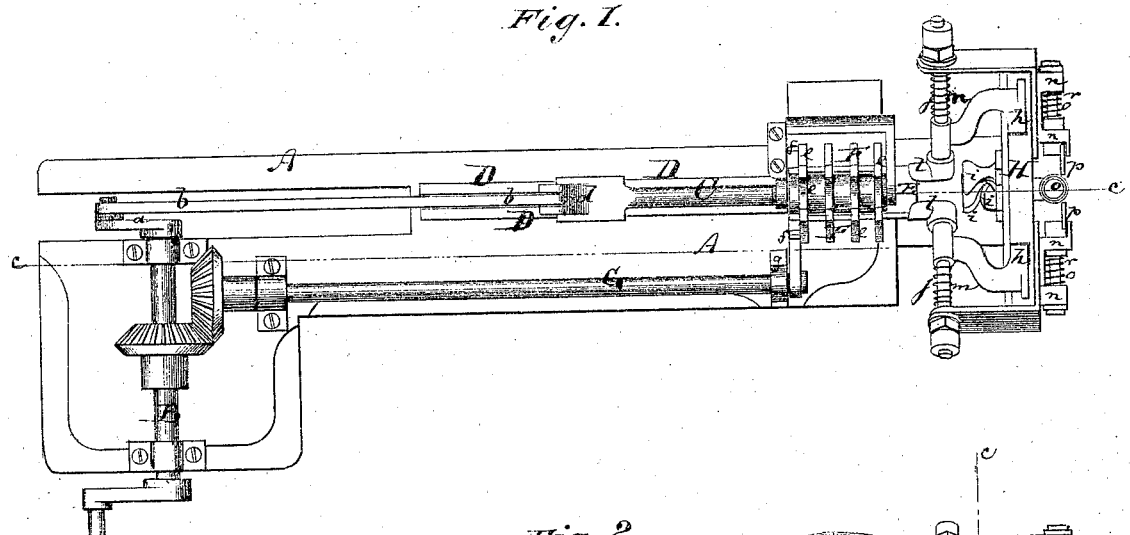
Fig. 2.
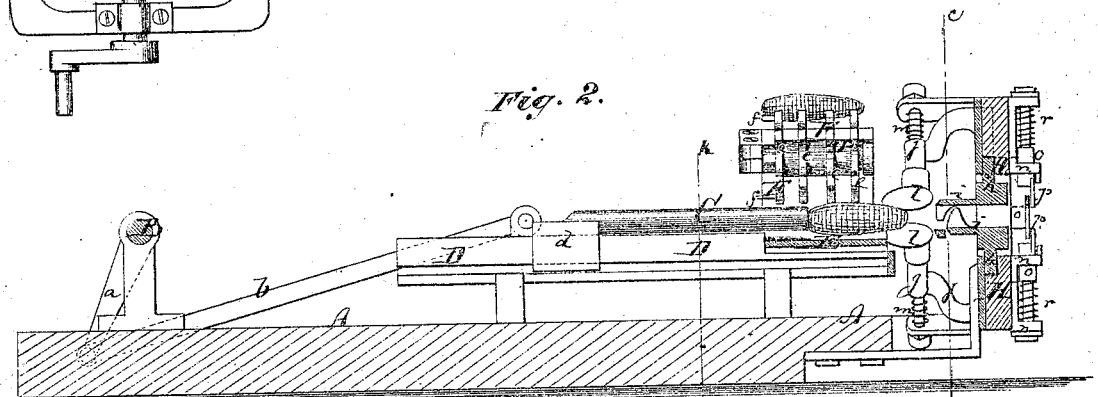
Fig. 3. Fig. 4. Fig. 5.
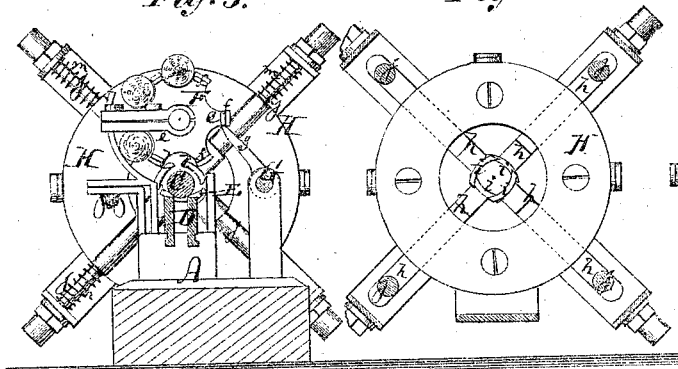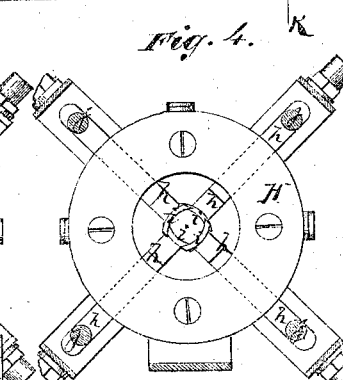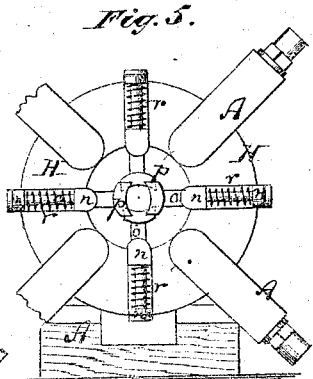
Witnesses:
Gustave Dieterich
Francis McAdale
Inventor:
E. Watts
Per Munn & Co.
Attorneys.

118,564

UNITED STATES PATENT OFFICE.

ELIAS WATTS, OF KEY PORT, NEW JERSEY.

IMPROVEMENT IN CORN-SHAVING MACHINES.

Specification forming part of Letters Patent No. 118,564, dated August 29, 1871.

*To all whom it may concern:*

Be it known that I, ELIAS WATTS, of Key Port, in the county of Monmouth and State of New Jersey, have invented a new and Improved Machine for Shaving Corn; and I do hereby declare that the following is a full, clear, and exact description thereof, which will enable others skilled in the art to make and use the same, reference being had to the accompanying drawing forming part of this specification.

Figure 1 represents a plan or top view of my improved corn-shaving machine. Fig. 2 is a vertical longitudinal section of the same on the line $c\ c$, Fig. 1. Fig. 3 is a vertical transverse section of the same on the line $k\ k$, Fig. 2. Fig. 4 is a vertical transverse section of the same on the line $c\ k$, Fig. 2. Fig. 5 is an end view of the same.

Similar letters of reference indicate corresponding parts.

This invention relates to a new machine for shaving green corn, so as to separate from the cobs the grains and juice useful for canning. The invention consists in such an arrangement of parts that the shaving process can be carried on by steam or other powerful agent, and performed thoroughly and with rapidity.

A in the drawing represents the frame of my improved corn-shaving machine. At the back end of this frame are the bearings of a transverse shaft, B, to which rotary motion is applied from a steam-engine or other suitable mechanism. By means of a crank, $a$, and rod $b$, the shaft B is connected with a horizontal plunger, C, to which reciprocating motion is imparted by the rotation of the shaft. The back end of the plunger is secured to a suitable cross-head, $d$, which slides on a track, D, that is rigidly supported on the frame. In the front of the track D is secured to the frame a horizontal trough, E, into which the corn to be shaved is fed, to be pushed by the plunger toward the cutters and scrapers. Above the trough E is hung, in proper bearings, the feed-wheel F. The same is provided with a series of longitudinal grooves, into which the ears of corn to be shaved are placed. In the drawing the feed-wheel is represented as consisting of a series of disks, $e\ e$, which have notched edges in line with each other, so as to form the cavities for holding the corn; but it may as well be made in form of one grooved cylinder. From the back end of the feed-wheel project pins $f\ f$, which are struck by a crank, $g$, of a rotary shaft, G. The shaft is, by gearing or other means, connected with the driving mechanism, and carries its crank $g$ against a pin, $f$, just before the plunger starts its forward motion. The corn to be shaved is placed by hand or from a hopper into the upper groove of the feed-wheel, which wheel is then turned so as to carry the corn down into the trough E, whence it is ejected by the plunger. After each turn of the wheel another ear of corn is deposited in the then upper groove. In front of the trough E and feed-wheel is set up an annular plate, H, whose center is in line with the axis of the plunger. This plate carries four, more or less, radially-adjustable rods, $h\ h$, which at their inner ends carry concave knives $i\ i$. The shanks or rods $h$ of the knives are, beyond the circumference of the disk, connected with other shanks or rods $j$, that carry at their lower ends concave plates or guides $l\ l$. Springs $m\ m$ serve to crowd those guides toward the center of the disk, and to therefore adapt them to hold the small ends of the corn. The knives, being by their shanks rigidly connected with the guides $l$, move simultaneously with them in whatever direction the same may be adjusted. The corn is, by the plunger, forced through the guides and knives, the latter embracing it and cutting off the grain. The springs $m$ permit the guides and knives to adjust themselves automatically to the varying thicknesses of the several ears, and to fit and guide them properly. To the face of the disk or plate H are affixed ears $n\ n$, for the guidance of radial bars $o$, which carry, at their inner ends, concave scrapers $p\ p$. These scrapers are, by springs $r$, forced against the cobs, which have, by the knives, been deprived of their grain, and serve to scrape said cobs and remove therefrom any portions of grains that may have remained, and also all juice and matter useful for canning. This machine can operate with great rapidity, a continuous row of ears being, by the plunger, rapidly conveyed through the guides, knives, and scrapers, the separated grain and matter being collected in suitable receptacles to be prepared for canning.

Having thus described my invention, I claim as new and desire to secure by Letters Patent—

1. The reciprocating plunger $c$, applied in connection with the feed-wheel, for supplying corn to the shaving-tools, substantially as herein shown and described.

2. The grooved feed-wheel F, receiving intermittent rotary motion for depositing the corn in front of the plunger, as set forth.

3. The spring-guides $l\ l$, knives $i\ i$, and spring-scrapers $p\ p$, arranged and operating as specified.

ELIAS WATTS.

Witnesses:
 ALFRED WALLING,
 ALFRED WALLING, Jr.